US008069044B1

(12) United States Patent  
Moorer (10) Patent No.: US 8,069,044 B1  
(45) Date of Patent: Nov. 29, 2011

(54) CONTENT MATCHING USING PHONEME COMPARISON AND SCORING

(75) Inventor: James Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 1187 days.

(21) Appl. No.: 11/724,975

(22) Filed: Mar. 16, 2007

(51) Int. Cl.  
*G06F 17/27* (2006.01)  
*G10L 15/00* (2006.01)  
*G10L 15/04* (2006.01)  
*G10L 11/00* (2006.01)

(52) U.S. Cl. ............ 704/254; 704/9; 704/231; 704/243; 704/270

(58) Field of Classification Search ................ 704/243, 704/254  
See application file for complete search history.

(56) References Cited

U.S. PATENT DOCUMENTS

| | | | |
|---|---|---|---|
| 4,783,811 A | 11/1988 | Fisher et al. | |
| 5,884,249 A * | 3/1999 | Namba et al. | 704/9 |
| 6,029,124 A | 2/2000 | Gillick et al. | |
| 6,882,970 B1 * | 4/2005 | Garner et al. | 704/236 |
| 7,212,968 B1 * | 5/2007 | Garner et al. | 704/251 |
| 7,231,351 B1 | 6/2007 | Griggs | |
| 7,263,484 B1 | 8/2007 | Cardillo et al. | |
| 7,313,521 B1 | 12/2007 | Cardillo et al. | |
| 7,324,939 B1 | 1/2008 | Cardillo et al. | |
| 7,406,415 B1 | 7/2008 | Cardillo et al. | |
| 7,475,065 B1 | 1/2009 | Cardillo et al. | |
| 7,487,086 B2 | 2/2009 | Griggs | |
| 7,640,161 B2 | 12/2009 | Morris et al. | |
| 2002/0135618 A1 * | 9/2002 | Maes et al. | 345/767 |
| 2003/0065655 A1 * | 4/2003 | Syeda-Mahmood | 707/3 |
| 2006/0036462 A1 * | 2/2006 | King et al. | 705/1 |
| 2007/0033003 A1 | 2/2007 | Morris | |
| 2007/0150275 A1 * | 6/2007 | Garner et al. | 704/235 |
| 2007/0208564 A1 * | 9/2007 | Tran | 704/254 |
| 2008/0162472 A1 * | 7/2008 | Cheng et al. | 707/6 |
| 2009/0063151 A1 | 3/2009 | Arrowood | |

OTHER PUBLICATIONS

U.S. Appl. No. 11/654,940, James A. Moorer.  
Nexidia. "Technology: What Can Speech Analytics Do for You?" [Online] Oct. 3, 2007. <http://www.nexidia.com/technology/technology.php>.  
World Advertising Research Center. "Product Categories" [Online] Feb. 12, 2008. <http://www.warc.com/landingpages/productcategories/default.asp>.  
Google. "Advertise Your Business on Google" [Online] Feb. 12, 2008. <http://adwords.google.com/select/Login>.  
Yahoo! Small Business. "Search Engine Marketing: How does it work?" [Online] Feb. 12, 2008. <http://sem.smallbusiness.yahoo.com/searchenginemarketing/basics.php>.  
Amazon. "Advertise With Amazon" [Online] Feb. 12, 2008. <http://www.amazon.com/Advertising/b?ie=UTF8&node=276241011>.  
Microsoft Digital Advertising Solutions. "Advertise with Us: Microsoft Digital Advertising Solutions" [Online] Feb. 12, 2008. <http://advertising.microsoft.com/home/home>.

(Continued)

Primary Examiner — Justin Rider  
(74) Attorney, Agent, or Firm — Robert C. Kowert; Meyertons, Hood, Kivlin, Kowert & Goetzel, P.C.

(57) ABSTRACT

Content matching using phoneme comparison and scoring is described, including extracting phonemes from a file, comparing the phonemes to other phonemes, associating a first score with the phonemes based on a probability of the other phonemes matching the phonemes, and providing the file with another file when a request is received to access one or more files having a second score that is substantially similar to the first score.

26 Claims, 9 Drawing Sheets

OTHER PUBLICATIONS

Needleman & Wunsch, "A General Method Applicable to the Search for Similarities in the Amino Acid Sequence of Two Proteins," 1970, pp. 443-453, vol. 48, No. 3, Journal Molecular Bio.

Jelinek, et al., "Design of a Linguistic Statistical Decoder for the Recognition of Continuous Speech," May 1975, pp. 250-256, vol. IT-21, No. 3, IEEE IT.

Waibel, Hanazawa, Hinton, Shikana and Lang, "Phoneme Recognition Using Time-Delay Neural Networks," Mar. 1989, pp. 328-339, vol. 37, No. 3, IEEE ASSP.

Lippman, "An Introduction to Computing with Neural Nets," Apr. 1987, pp. 4-22, vol. 4, IEEE ASSP Magazine.

Brown, Peter F., "The Acoustic-Modeling Problem in Automatic Speech Recognition," May 1987, Carnegie-Mellon, Computer Science Department, 12 pages.

Rabiner, Lawrence, "A Tutorial of Hidden Markov Models and Selected Applications in Speech Recognition," Feb. 1989, pp. 257-286, vol. 77, No. 2, Proceedings of the IEEE.

Jelinek, Frederick, "Continuous Speech Recognition by Statistical Methods," Apr. 1976, pp. 532-556, vol. 64, No. 4, Proceedings of the IEEE.

* cited by examiner

CONTENT MATCHING USING PHONEME COMPARISON AND SCORING

CROSS-REFERENCE TO RELATED APPLICATIONS

This application is related to co-pending U.S. patent application Ser. No. 11/654,940, filed Jan. 18, 2007 and entitled "Audio Comparison Using Phoneme Recognition," which is herein incorporated by reference for all purposes.

FIELD OF THE INVENTION

The present invention relates generally to audio recognition and software. More specifically, content matching using phoneme comparison and scoring is described.

BACKGROUND OF THE INVENTION

The Internet, World Wide Web, and other types of networks are large and available sources of data, which may be downloaded, retrieved, copied, read, or otherwise accessed. Data is typically stored as files using different types of formats for video, audio, multi-media, and the like. However, data is often copied and stored in different locations throughout the Internet, Web, or other networked locations. Locating copies of data throughout the Internet is difficult and conventional techniques for identifying and locating copies are problematic and do not scale very well. Further, for certain types of data formats such as audio, conventional techniques for recognizing and identifying files are inefficient, inaccurate, and time and labor-intensive.

Some conventional techniques for processing audio data use phonetic recognition. However, phonetic recognition requires substantial processor and memory resources to process a recorded audio stream into identifiable words or phrases. Due to the large number of words or phrases in spoken languages, conventional techniques are slow and inaccurate, thus requiring substantial manual review. Further, conventional phonetic recognizers are not configured to determine whether a given stream of audio data is a copy of another stream of audio data, again requiring time-intensive manual review and input.

Thus, a solution for audio comparison without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, and Fireworks® may also be used to implement the described techniques. The described techniques may be varied and are not limited to the examples or descriptions provided.

Content matching using phoneme comparison and scoring is described, including detecting a set or sequence ("sequence") of phonemes within data, such as an audio file, video file including audio data, an audio recording (e.g., music, song, or other sound recording), or the like. Once detected, a sequence of phonemes may be compared against other sequences of phonemes that are associated with known words, phrases, data, information, or the like. In some examples, phoneme recognition may be performed to identify specific words or phrases. In other examples, phoneme recognition may be omitted, instead performing a comparison by taking the output of, for example, an acoustic processor and, using mathematical measurements such as Euclidian or quadratic distance function measurements, to determine similarities between detected sequences of phonemes and known sequences of phonemes. In still other examples, an acoustic processor or phoneme recognizer may be used to identify sequences of phonemes into known words or phrases in a given language (e.g., English, Spanish, Japanese, Mandarin Chinese, and others). Known sequences of phonemes may also be associated with content such as files similar to those described above. A spoken language may be resolved into various phonemes that, when assembled into sequences, may identify words or phrases. Once identified, sequences of phonemes may be used to further identify content that matches the file being evaluated. In other words, by using phoneme comparison, sequences of phonemes may be used to determine whether a file is substantially similar to another file. Copies of files or other data may be found by comparing and analyzing similar sequences of phonemes. In other examples, the described techniques may be used to organize files based on a score resulting from a comparison of a sequence of phonemes against another sequence of phonemes. Content (e.g., files of various media formats) may be organized by grouping, storing, associating, tagging, or otherwise associating a file with another file based on a score that indicates a substantial similarity. In other examples, phoneme comparison and scoring may be performed differently and are not limited to the descriptions provided.

Figure 1:
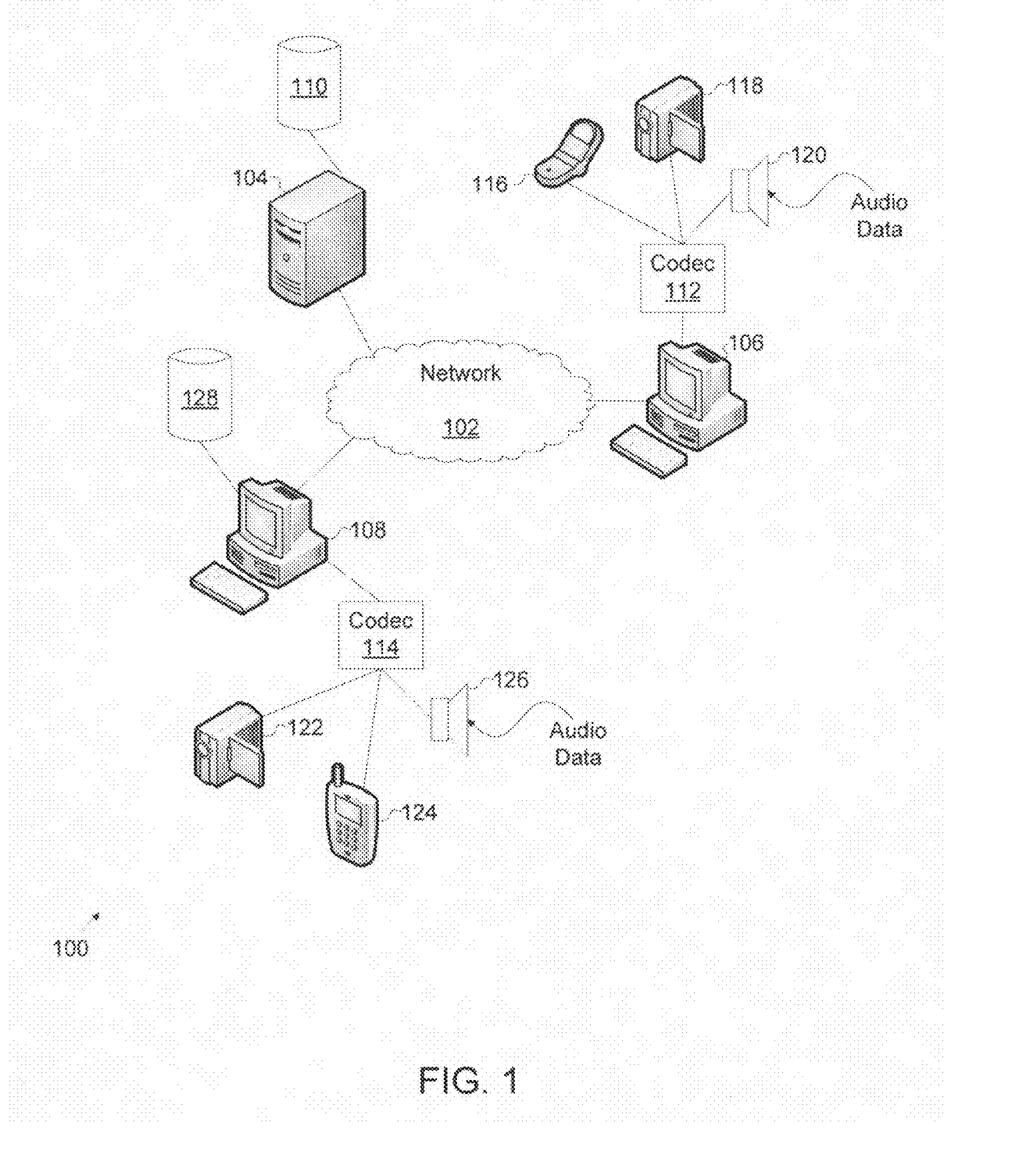
FIG. 1 illustrates an exemplary phoneme comparison and scoring system.

FIG. 1 illustrates an exemplary phoneme comparison and scoring system. Here, system 100 includes network 102, server 104, and clients 106-108. Server 104 may be in data communication with database 110. Client 106 and 108 may be configured to receive or transmit encoded/decoded data using codecs 112-114, respectively. In some examples, codec 112 may be used to encode/decode data received or transmitted from mobile communication device 116 (e.g., smart phone, cell phone, mobile phone, personal digital assistant (PDA), and others), digital camera 118, or transceiver 120, which may be configured to receive sound in the form of an analog signal that is transformed by codec 112 from an analog wave format to a digitally encoded data signal. In other examples, codec 112 may receive data from more, fewer, or different sources apart from those shown. Further, sources (e.g., mobile communication device 116, digital camera 118, transceiver 120) may be in direct or indirect data communication with codec 112. Likewise, codec 114 may be configured for receiving data from a direct or indirect data communication link with digital video cameras 118 and 122, mobile communication device 124, and transceiver 126, which may be configured to receive an analog signal that is transformed into digital data. Further, clients 108 may be coupled to a remote database, data warehouse, data mart, data store, repository, or other data storage facility such as repository 128. Repository 128 may be used for storage, access, and retrieval of data such as known sequences of phonemes when performing content matching using phoneme comparison and scoring.

In some examples, system 100 may be used for content matching using phoneme comparison and scoring. For example, a detected audio signal may be received by transceiver 120 and encoded by codec 112 (e.g., A/D codec) into digital format and sent to client 106. Data may be encoded digitally using various formats, but the described examples are not limited to any particular data format, protocol, or encoding scheme. Client 106 may, for example, have an application hosted, running, downloaded, compiled, or otherwise executed that performs phoneme comparison and scoring to determine whether the audio signal matches other audio data or files that are associated with known sequences of phonemes. In other examples, system 100 may be include more, fewer, or different elements than those shown, which may also be configured, designed, or implemented differently than shown and described.

Figure 2:
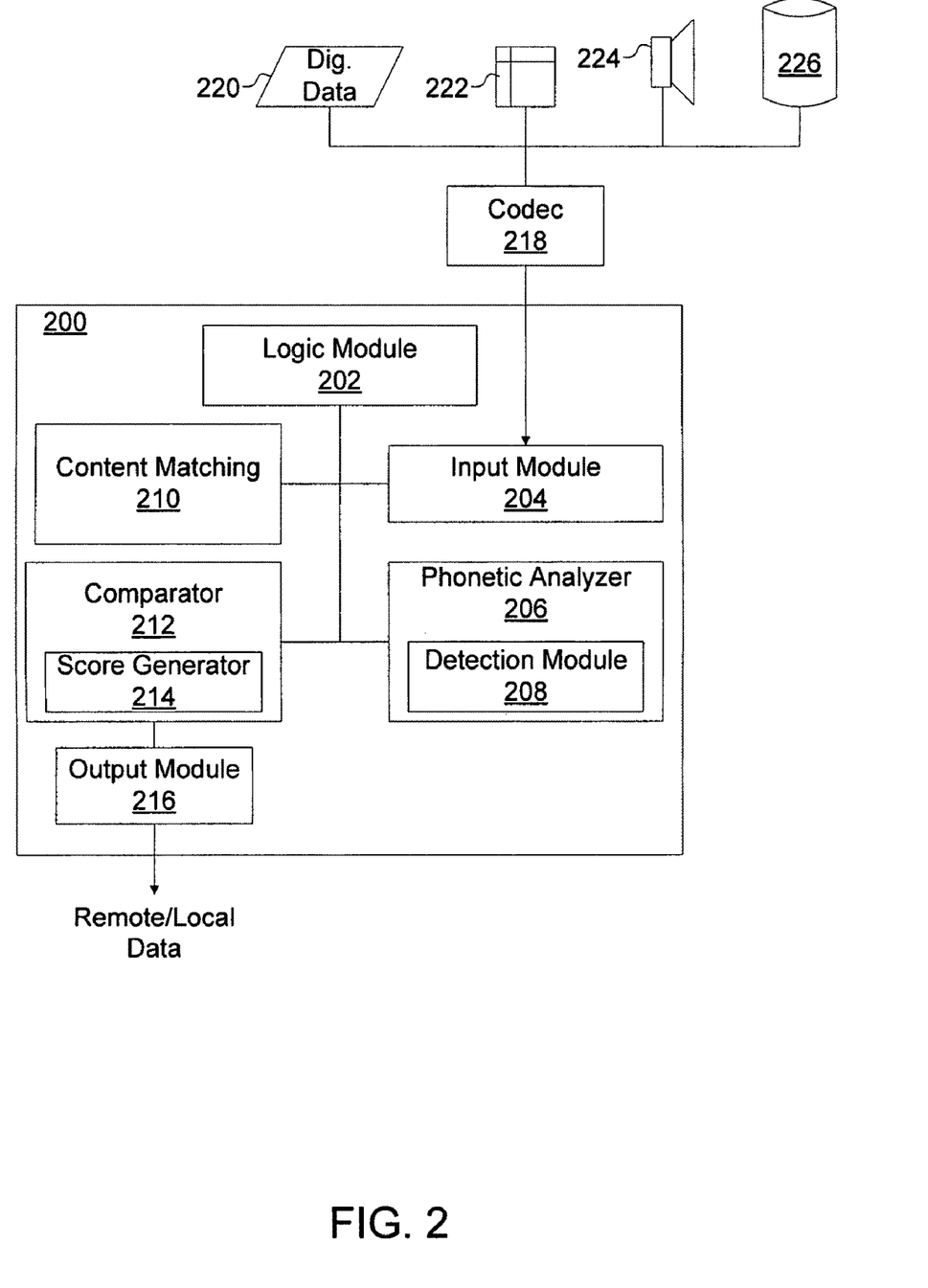
FIG. 2 illustrates an exemplary phoneme comparison and scoring application.

FIG. 2 illustrates an exemplary phoneme comparison and scoring application. Here, application 200 includes logic module 202, input module 204, phonetic analyzer 206, detection module 208, content matching 210, comparator 212, score generator 214, and output module 216. Other elements or modules (e.g., acoustic processor, digital signal processor, and others) may be used and are not limited to those shown. For example, a digital signal processor (DSP; not shown) may be implemented to provide encoding/decoding/processing of input signals to output a digital signal to, for example, codec 218. As another example, phonetic analyzer 206 may be implemented within an acoustic processor (AP; not shown) that is used to output acoustic (i.e., audio) data to logic module 202. In still other examples, the type, configuration, and number of modules implemented in application 200 may be varied and are not limited to the examples shown.

In some examples, codec 218 may be implemented to encode or decode audio data (i.e., data obtained by encoding or decoding an analog signal or digital data that, when rendered, generates sequences of phonemes) from various sources. Sources may include digital data 220, internally stored data 222, audio signals received and sent by receiver 224 to codec 218, and remote stored data 226. Audio data may be operated upon by application 200 once received as a stream or file of digital data encoded/decoded by codec 218. Codec 218 may encode/decode analog and digital data for use by application 200. For example, an analog signal or waveform may be received by receiver 224, which may be implemented using any type of signal reception hardware, software, firmware, or combination thereof. Once received, an analog signal may be sampled and converted into digital data that is transmitted to codec 218. In some examples, data may be sent and received using various types of encoding protocols such as voice-over-Internet-Protocol ("VoIP"), H.263, IEEE or ITU standards, and others. Data sources 220-226 may be local or remote (e.g., networked) sources and are not limited to the types shown or the descriptions provided. In other words, different types and sources of data may be used to provide audio data to application 200 and are not limited to the examples shown.

Here, data may be associated with files including audio data (e.g., audio files, video files including sound or audio, music or song files, digital or analog sound recordings, and others) and provided to application 200 for phoneme comparison and matching. As an example, data 220 may be encoded or decoded by codec 218 and sent to application 200 using input module 204. Once received by input module 204, logic module 202 may control different modules to determine whether audio data is present in the received data. For example, logic module 202 may control (i.e., send a control signal to) phonetic analyzer 206 and detection module 208 to determine whether sequences of phonemes are found within the audio data. Once detected, a sequence of phonemes may be compared against other known sequences of phonemes by comparator 212. In some examples, detected sequences of phonemes may be identified with known words or phrases. In other examples, logic module 202 may instead perform a distance function measurement (e.g., Euclidean, Quadratic, Manhattan, and others) to determine how close a waveform for a detected sequence of phonemes compares to another waveform associated with a known sequence of phonemes, without performing phoneme recognition. In other words, points or vectors associated with compared waveforms may be compared using mathematical distance function measurements to determine how closely they resemble each other, without requiring the identification of phonemes associated with the waveforms.

Here, a score may be assigned to a given comparison by score generator 214. In some examples, a score may indicate the numerical or percentage probability of a detected sequence of phonemes matching a known sequence of phonemes. In other examples, a score may be generated if a close enough match is performed (e.g., 75%, 85%, 90%, or 95% substantial similarity, or the like). If a probability of a substantial similarity is low or fails to meet a certain threshold (e.g., 5%, 10%, 20%, or the like), which may be automatically or manually set at any desired percentage, then a score may not be generated. In other examples, a score may be assigned to indicate an exact match or complete (e.g., 100%) similarity, thus allowing the files associated with the matching audio data to be identified as copies of the same file. In still other examples, a score may be compiled or generated to indicate different attributes of a comparison performed between a sequence of phonemes and a known sequence of phonemes. For example, a score may be used to indicate that a sequence of phonemes is a subset of, but is substantially similar to another known sequence of phonemes. This may indicate that a sequence of phonemes undergoing comparison is audio data taken from a file that may have other types of data (e.g., video, image, text, multimedia data, and others). In yet other examples, if a score indicates a substantial similarity between a sequence of phonemes and a known sequence of phonemes, the files associated with each may be grouped together, tagged to identify the substantially similar relationship, or otherwise identified to enable a user to store, find, retrieve, and access both files (i.e., substantially similar sequences of phonemes). Output module 216 may be implemented to store the sequence of phonemes after performing a comparison and generating a score. Output module 216 may also be configured to output data or metadata that may be used to tag or otherwise identify a sequence of phonemes as being substantially similar to another known sequence of phonemes. For example, a compared sequence of phonemes may be identified as a scene from a movie that is substantially similar to another known file (i.e., sequence of phonemes) representing the same scene of the movie. Output module 216 may be used to group the compared file with the known file, thus allowing a user to retrieve both files together. Further, the compared file and the known file may be grouped and retrieved together in order to view substantially similar scenes of the same movie that may vary due to, for example, different cameras or camera angles being used. The above-described techniques and application 200 may be used to identify exact and substantially similar matches using phoneme comparison and scoring to allow groups of audio data to be aggregated together if common traits, characteristics, parameters, or the like are found. Alternatively, the above-described examples, elements, and descriptions for application 200 may be varied and are not limited to those provided.

Figure 3A:
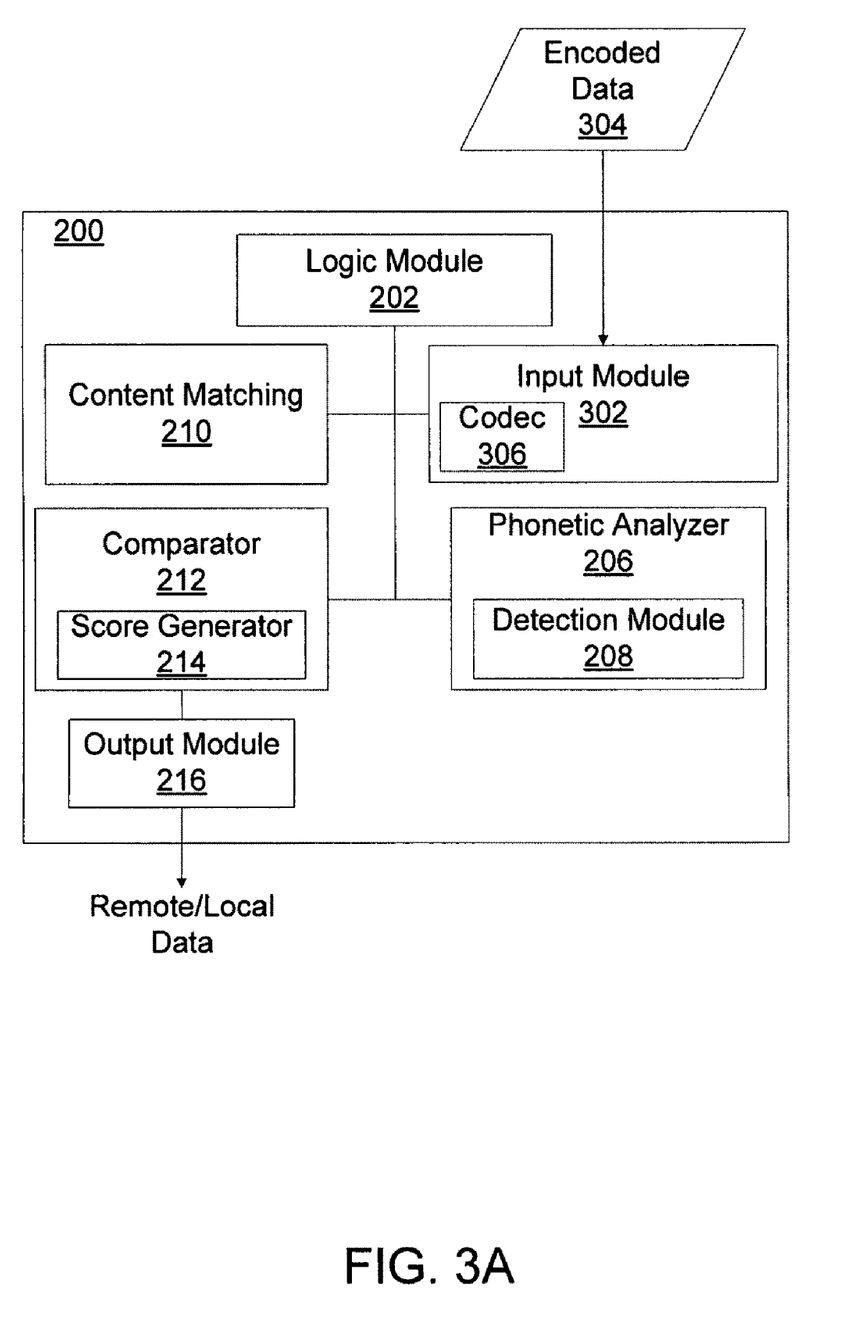
FIG. 3A illustrates an alternative exemplary phoneme comparison and scoring application.

FIG. 3A illustrates an alternative exemplary phoneme comparison and scoring application. Here, application 200 includes logic module 202, input module 302, phonetic analyzer 206, detection module 208, content matching 210, comparator 212, score generator 214, and output module 216. In some examples, logic module 202, phonetic analyzer 206, detection module 208, content matching 210, comparator 212, score generator 214, and output module 216 may be implemented as described above in connection with FIG. 2. In other examples, input module 302 may be implemented to receive data from various sources (e.g., digital data 220, internally stored data 222, remote stored data 226 (FIG. 2)).

Here, input module 302 may also include codec 306, which may be used to encode or decode data for use by application 200. In some examples, codec 306 may receive data from various types of audio data sources, such as those described above. Codec 306 may be implemented as an internal module or set of functions or processes within input module 302 or another module of application 200. As described above, input module 302 may be configured to receive audio signals and audio data that are decoded and analyzed by phonetic analyzer 206 to determine whether a sequence of phonemes is substantially similar to a known sequence of phonemes. Techniques such as those previously described may be used to analyze, compare, and otherwise determine whether audio data from a sound recording, music file, video, or the like is substantially similar to another file. Audio data may be found in different types of files. For example, a video file may be evaluated using the described techniques to determine whether a sound recording matches embedded audio within the video file. Likewise, an audio file may be evaluated using the described techniques to determine whether it is the audio portion (i.e., sound recording, soundtrack, musical component, and the like) of a video recording. In other examples, application 200 and the above-described elements may be varied and are not limited to the examples provided.

Figure 3B:
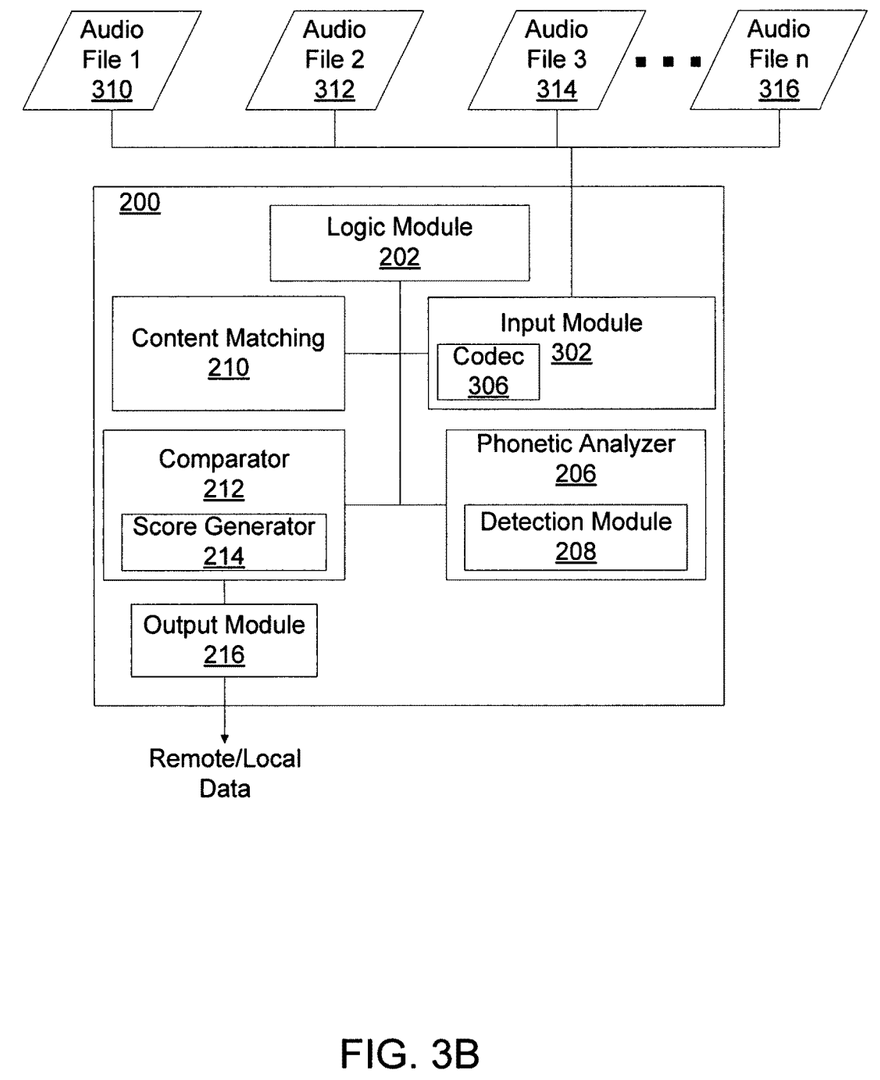
FIG. 3B illustrates another alternative exemplary phoneme comparison and scoring application.

FIG. 3B illustrates another alternative exemplary phoneme comparison and scoring application. Here, application 200 includes logic module 202, input module 302, phonetic analyzer 206, detection module 208, content matching 210, comparator 212, score generator 214, output module 216, input module 302, and codec 306. In some examples, application 200 includes logic module 202, input module 302, phonetic analyzer 206, detection module 208, content matching 210, comparator 212, score generator 214, output module 216, input module 302, and codec 306 may be implemented as described above in connection with FIGS. 2 and 3. Sequences of phonemes may be detected in audio data found in audio files (e.g., audio files 310-316). Application 200 may be used to evaluate detected sequences of phonemes in audio data found in, for example, multiple audio files. As an example, application 200 may be used to determine whether multiple audio files (e.g., audio files 310-316) are substantially similar to each other by analyzing detected sequences of phonemes found in audio files received by input module 302. Further, sequences of phonemes found in audio files 310-316 may be evaluated to determine whether audio files 310-316 are substantially similar to each other. For example, sequences of phonemes may be evaluated to determine whether audio file 312 is a copy of audio files 310 and 314-316. Sequences of phonemes found in audio files 310-316 may also be compared to another known sequence of phonemes to determine whether audio files 310-316 are substantially similar to a known sound recording, music file, or other audio file. If detected sequences of phonemes in audio files 310-316 are found to be substantially similar to a known sequence of phonemes (i.e., a known audio file), then audio files 310-316 may be organized, indexed, tagged, or otherwise indicated as being related to the known sequence of phonemes (not shown). Thus, when a stored audio file having the known sequences of phonemes is compared to a new audio file, which is found to have a substantially similar sequence of phonemes, the audio file may be tagged to indicate that when the stored audio file is accessed, the new audio file should also be accessed. Further, when the stored audio file is retrieved, other audio files having substantially similar sequences of phonemes may be retrieved. Still further, when the stored audio file or an audio file having the known sequence of phonemes is requested, an option may be provided (e.g., on a user interface generated by application 200) to allow the selection of other audio files (e.g., audio files 310-316) that have substantially similar sequences of phonemes. Here, the described techniques may be used to determine whether substantially similar sequences of phonemes are present, regardless of other improvements, alterations, or other modifications of sound quality or attributes (e.g., tone, volume, and others). In still other examples, application 200 may be implemented and used differently than described above. Further, application 200 and the above-described elements may be varied and are not limited to the examples provided.

Figure 3C:
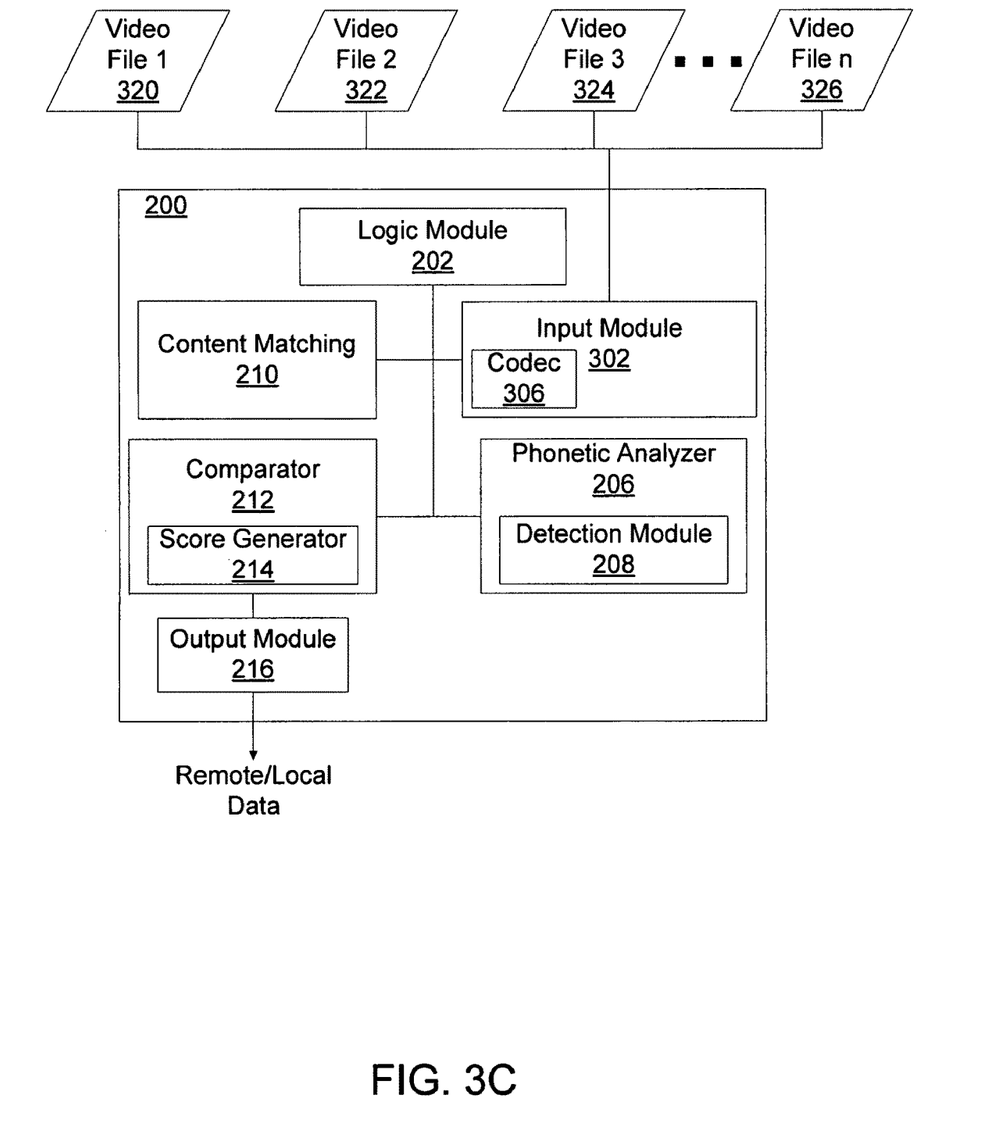
FIG. 3C illustrates yet another alternative exemplary phoneme comparison and scoring application.

FIG. 3C illustrates yet another alternative exemplary phoneme comparison and scoring application. Here, application 200 includes logic module 202, input module 302, phonetic analyzer 206, detection module 208, content matching 210, comparator 212, score generator 214, output module 216, input module 302, and codec 306. Application 200 includes logic module 202, input module 302, phonetic analyzer 206, detection module 208, content matching 210, comparator 212, score generator 214, output module 216, input module 302, and codec 306 may be implemented as described above in connection with FIGS. 2 and 3. In some examples, sequences of phonemes may also be found in multi-media files such as video files 320-326. By evaluating sequences of phonemes found in audio data detected within video files 320-326, comparator 212 may be used to determine whether a match exists with a known sequence of phonemes (i.e., a known audio or other multi-media file). Evaluating detected sequences of phonemes found in audio data allows determining whether the audio data in video files 320-326 match other known audio data without having to evaluate other data, including video data, image data, and the like. This reduces the amount of processing by eliminating other types of processing for video data, image data, visual presentation data, lighting, and others. In other words, video files 320-326 may represent "1" through "n" different "takes" or recordings of a given scene in, for example, a movie. When sequences of phonemes within video files 320-326 are evaluated and found to be substantially similar to a known sequence phonemes, video files 320-326 may be organized with the known video file (i.e., known sequence of phonemes) as being substantially similar. Multiple takes of the same or substantially similar scene of a movie, which may or may not be recorded from different camera angles, may be evaluated to determine whether substantial similarity exists. In other examples, portions of a movie scene may be grouped together with other similar portions or complete scenes using the above-described techniques. For example, a section of audio data may represent a smaller portion of a movie scene having a 10-minute duration. One file may represent the first five minutes, another file may represent the last five minutes, and a third file may represent only two minutes of sound recordings from intermittent portions of the scene. When the above-described techniques are performed, these files may be grouped or organized together as files that are related to a similar scene. In still other examples, files of different lengths may be grouped or organized together if a comparison shows that the audio data analyzed within each is found to be substantially similar using, for example, mathematical distance function measurements or other techniques to compare waveforms of audio data. In yet other examples, a selected spoken phrase may be used to perform a comparison against its host file in order to determine whether other uses of this phrase are spoken, for example, in a movie, scene, song, sound recording, or other audio recording.

Here, video files 320-326 may be organized with another known video file (i.e., based on included audio data) and, when requested, presented to a user as being substantially similar based on a score generated by score generator 214, which is used by content matching module 210 to generate a match with known content (i.e., known sequences of phonemes). In other examples, application 200 may be used differently than as described above. Further, application 200 and the above-described elements, including different types of data inputs (i.e., video files 320-326) may be varied in design, implementation, and function and are not limited to the examples provided.

Figure 4:
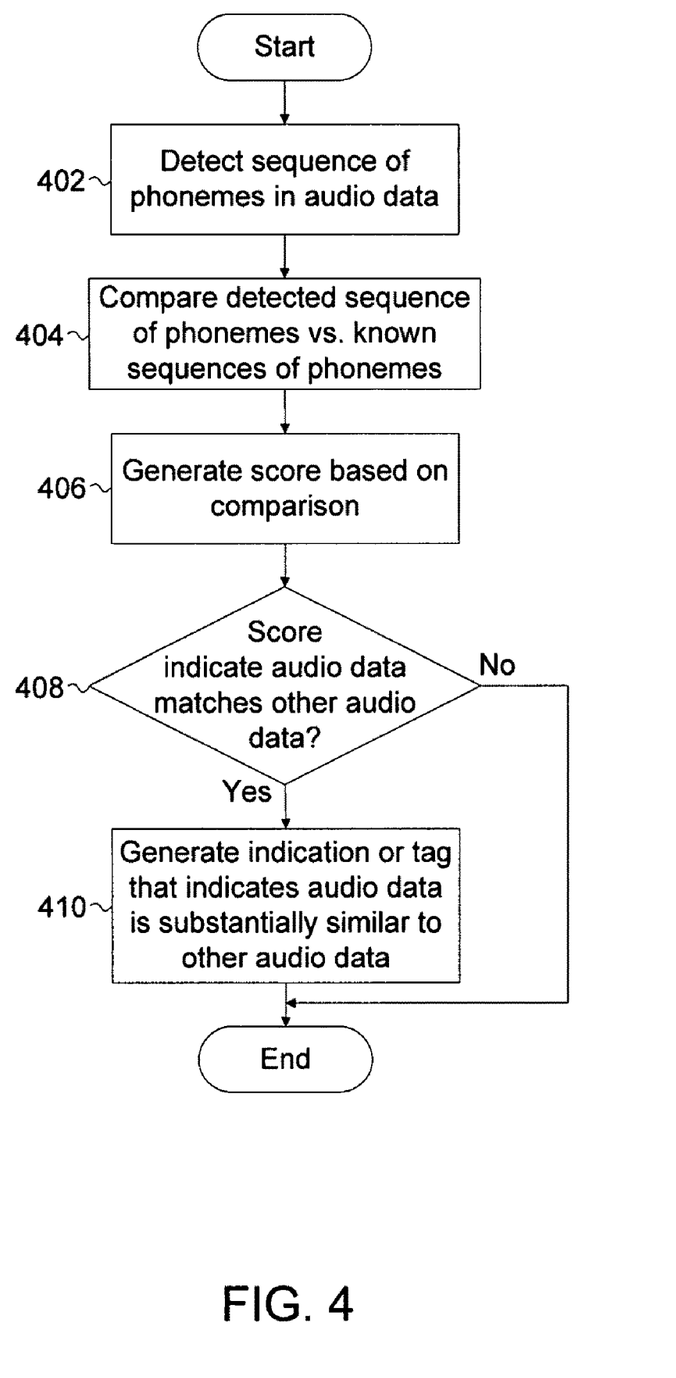
FIG. 4 illustrates an exemplary process for content matching using phoneme comparison and scoring.

FIG. 4 illustrates an exemplary process for content matching using phoneme comparison and scoring. Here, a sequence of phonemes is detected in audio data (402). As described above, a sequence of phonemes may be detected in audio data found in any type of file or signal that includes an audio component (e.g., signal or data). Types of files may include video files, sound recordings, movies, and others. If a signal, the audio signal may be encoded into a digital format by a codec (e.g., codec 306 (FIGS. 3A-3C)) and evaluated by application 200 (FIGS. 2, 3A-3C). A detected sequence of phonemes is compared against one or more known sequences of phonemes (402). Subsequently, a score is generated based on a comparison between the detected sequence of phonemes and the known sequence of phonemes (404). In some examples, a score may be a numerical value (e.g., an integer, a real number, a percentage value, a fraction, and others) that indicates the strength or weakness of the detected sequence of phonemes matching a known sequence of phonemes. After generating a score for a given comparison between a detected sequence of phonemes and a known sequence of phonemes, a determination is made as to whether the score indicates the audio data including the detected sequence of phonemes matches other audio data (i.e., another file with a known sequence of phonemes) (408). If the score indicates a match (i.e., a substantial similarity or near-substantial similarity, the latter of which may be above a numerical value (e.g., if the score is greater than or equal to 95%, 0.95, or another quantitative threshold then identify the evaluated file (i.e., sequence of phonemes being compared) as being substantially similar to the known file in the comparison, if a score is less than or equal to 90% then do not identify the evaluated file as a substantially similar file, and others)), then a tag may be generated and associated with the file having the detected sequence of phonemes (410). In some examples, the generated tag or indicator may be used to identify a file having the detected sequence of phonemes as being related or substantially similar to another file having a known sequence of phonemes. In other words, a generated tag or identifier indicates that a file is substantially similar to another file. Thus, when a file is access, retrieved, or otherwise requested, the file and any substantially-similar files may also be provided. If the score does not indicate an evaluated file (i.e., detected sequence of phonemes) is substantially similar to another known file (i.e., known sequence of phonemes), then the process ends. In other examples, the above-described process may be varied in design, processes, sub-processes, and other aspects and is not limited to the description provided.

Figure 5A:
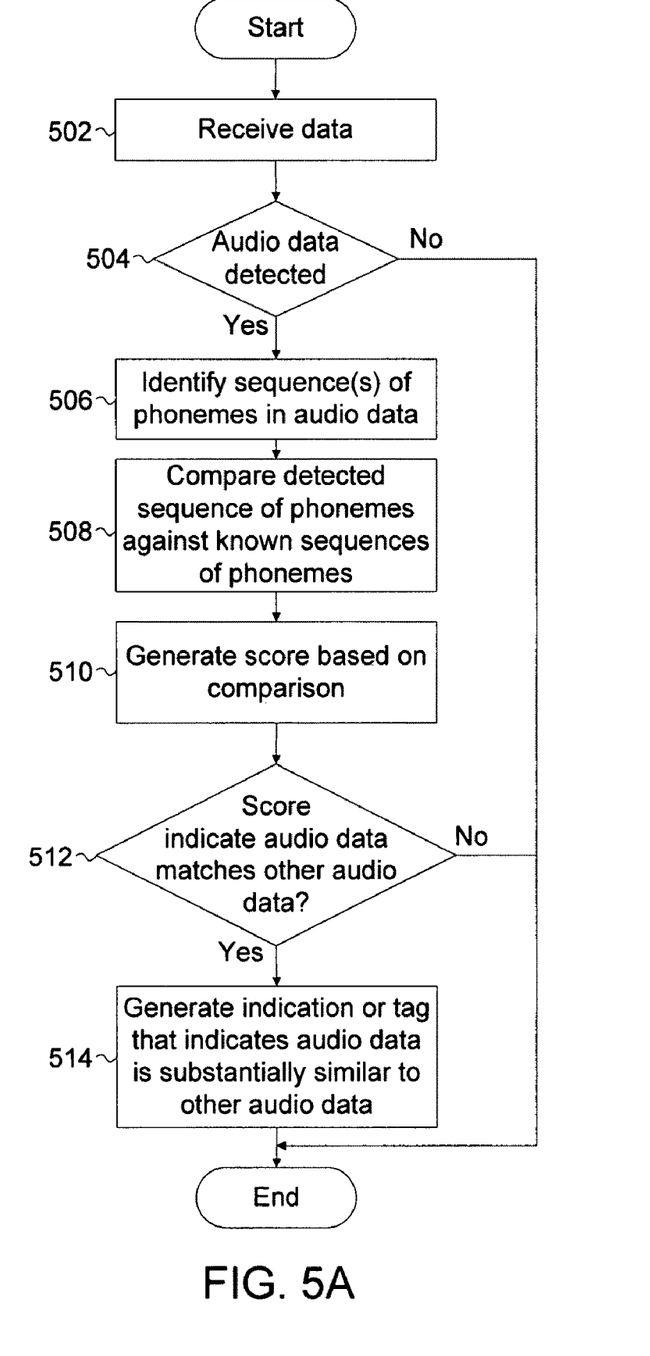
FIG. 5A illustrates an alternative exemplary process for content matching using phoneme comparison and scoring.

FIG. 5A illustrates an alternative exemplary process for content matching using phoneme comparison and scoring. Here, data is received by an application (e.g., application 200 (FIG. 2)) configured to identify phonemes (502). In some examples, data may be received as a file including audio data in a digital audio format. In other examples, data may be received as an analog audio signal and converted/encoded into a digital format using, for example, an A/D codec (e.g., codec 306 (FIGS. 3A-3C)). In still other examples, data may be received using other formats, encoding schemes, and encapsulation techniques apart from those described herein. Once received, data is evaluated to determine whether audio data is detected (504). If audio data is not detected, the process ends. However, if audio data is detected, then the audio data is further evaluated to identify sequences of phonemes within the audio data (506). Various techniques may be used for identifying sequences of phonemes and are not limited to any specific example.

Here, after identifying sequences of phonemes within audio data (e.g., a stream of digital data representing, constituting, or otherwise embodying audio signals once decoded), a comparison is performed between the detected sequence of phonemes and known sequences of phonemes (508). Based on the comparison, a score is generated (510). In some examples, a score is generated for all files being compared. In other examples, a score may be generated only for files that have greater than, for example, 50% of the analyzed sequences of phonemes matching (i.e., being substantially similar) to other sequences of phonemes. In still other examples, a score may be generated under different parameters or rules and is not limited to the examples provided.

A score may represent the probability that a detected sequence of phonemes matches another known sequence of phonemes. In other examples, a score may be a numerical indicator representing the strength of the detected sequence of phonemes matching a known sequence of phonemes. In other words, a score may reflect whether a detected sequence of phonemes is substantially similar in order, type, phonetic pronunciation, and other characteristics, which suggests that corresponding audio data is similar. In still other examples, a score may be generated and assigned differently and is not limited to the examples provided. Subsequently, the score is further evaluated to determine if a file associated with the received data (i.e., detected sequence of phonemes) is substantially similar to or matches another file (i.e., known sequence of phonemes) (512). If the file is not substantially similar to or matches another file, then the process ends. However, if the file is substantially similar to or matches another file, then an indication may be generated to indicate the received audio data is associated with a file that is substantially similar to or matches another file having a known sequence of phonemes (514). In other words, if the sequence of phonemes matches the known sequence of phonemes, then the file having the audio data may be organized with other files that have substantially similar sequences of phonemes. For example, a score of 85% may indicate that an audio file matches another audio file and should be organized such that when the latter is requested, the former is also presented as an option for retrieval as well. This may allow multiple files that are substantially similar to be grouped, stored, or otherwise organized together as having similar content. Further, audio, video, and other multi-media files may have the same or substantially similar audio recording, sound track, sound recording, or other audio data. In some examples, the audio data may be supplemented with video, multi-media effects, and other data. As an example, a scene of a movie may be recorded or "shot" from multiple camera angles, but still have the same sound recording. By evaluating the audio data as described above, these multiple scenes may be grouped together as being substantially similar or the same. In other examples, a file may have only audio data. The above-described process may be varied and is not limited to the examples provided.

Figure 5B:
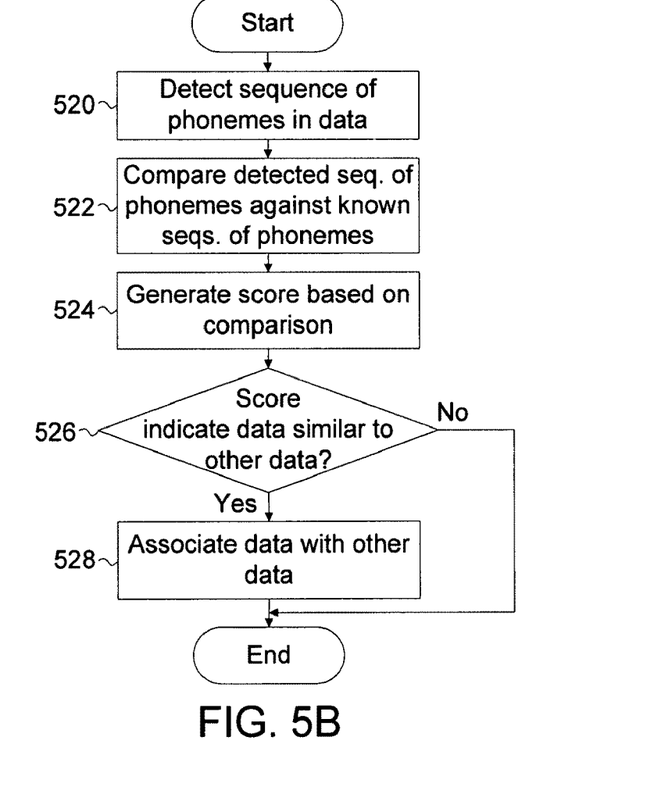
FIG. 5B illustrates an exemplary sub-process for content matching using phoneme comparison and scoring.

FIG. 5B illustrates an exemplary sub-process for content matching using phoneme comparison and scoring. Here, a sequence of phonemes is detected in audio data (520). The detected sequence of phonemes is compared to known sequences of phonemes, each of which may be associated with a different file having audio data (522). Based on the comparison and whether the detected sequence of phonemes is substantially similar to any known sequences of phonemes, a score is generated (524). A score may be used to determine whether the file having the sequence of phonemes is substantially similar to a known sequence of phonemes. In other examples, a score may indicate that a detected sequence of phonemes is an exact match of another sequence of phonemes, suggesting that the file is a copy or recording of another file. In other examples, a score may indicate that a detected sequence of phonemes is substantially similar to another known sequence of phonemes, which may be slightly different in audio quality because of the positioning of microphones, variations in video/audio cameras, and the like. By evaluating sequences of phonemes, substantially similar audio data or files may be organized together based on audio content. A determination is made as to whether the score indicates substantial similarity between the detected sequence of phonemes (i.e., audio data) and one or more known sequences of phonemes (i.e., known or previously-identified audio data) (526). If the score does not indicate a match between files, then the process ends. If the score does indicate a match or substantial similarity between files, then the audio data having the detected sequence of phonemes is associated with the known audio data (528). In some examples, audio data may be associated with other audio data by tagging the data to identify both files (i.e., audio data). In other examples, audio data may be associated with other audio data by storing the respective files together in a database, data repository, or other data storage location. In still other examples, audio data may be associated with other audio data having known sequences of phonemes differently and is not limited to the examples provided above. Further, the above-described process may be implemented differently and is not limited to the examples provided.

Figure 5C:
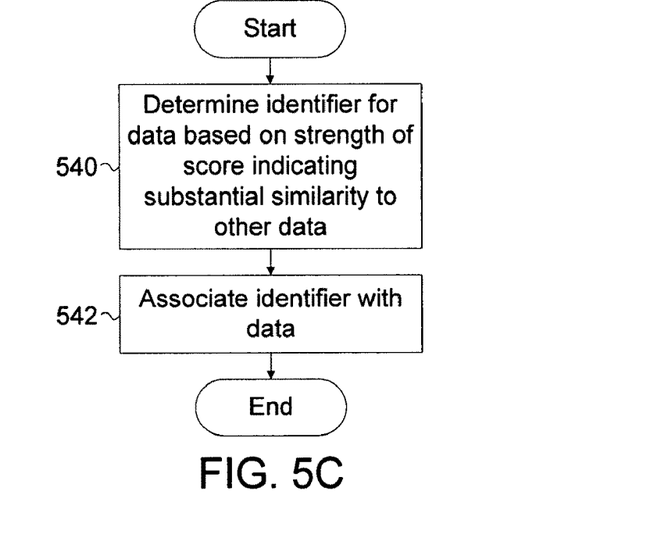
FIG. 5C illustrates another exemplary sub-process for content matching using phoneme comparison and scoring.

FIG. 5C illustrates another exemplary sub-process for content matching using phoneme comparison and scoring. Here, an identifier for data (i.e., audio data) is determined based on the strength of a score assigned to a file having one or more detected sequences of phonemes (540). Once determined, an identifier may be associated with audio data (i.e., file) and used to subsequently request, retrieve, or otherwise access the audio data having the detected sequence of phonemes (542). In some examples, an identifier may a tag, numerical or text-based markup indicator, field, value, symbol, token, or other element used to identify a sequence of phonemes or a file including a sequence of phonemes. Other techniques may be used to identify a file having a sequence of phonemes that is associated with another file that has substantially similar sequences of phonemes. In other examples, the above-described process may be varied and is not limited to the examples provided above.

Figure 6:
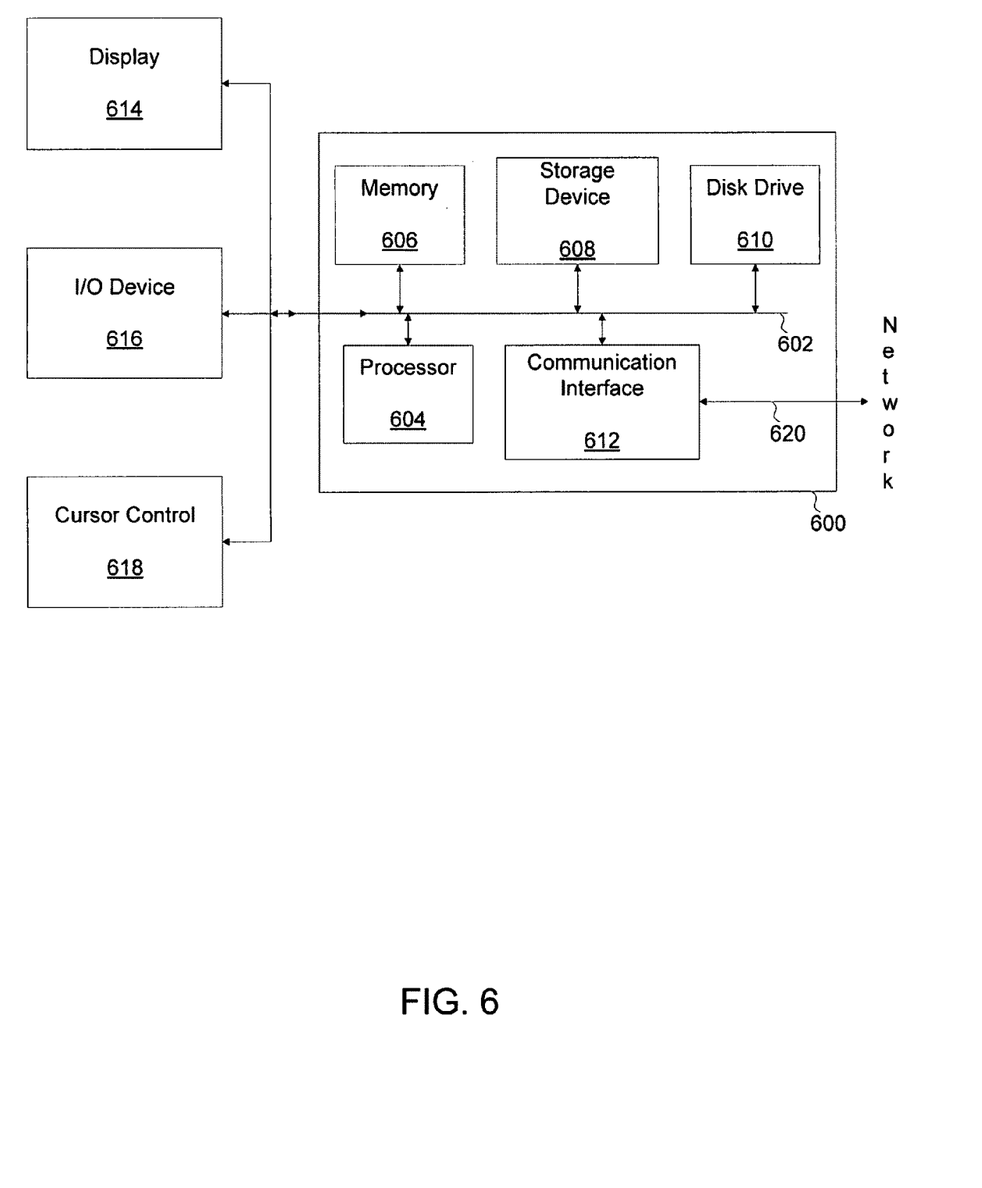
FIG. 6 illustrates an exemplary computer system suitable for content matching using phoneme comparison and scoring.

FIG. 6 illustrates an exemplary computer system suitable for content matching using phoneme comparison and scoring. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
 performing by a computer:
  accessing a previously identified collection containing a limited number of phoneme sequences;
  for each file of a plurality of files:
   detecting at least one sequence of phonemes in the file's audio component;
   comparing the at least one sequence of phonemes detected in the file's audio component to the collection of phoneme sequences; and
   generating a score, based on said comparing, that indicates a similarity between the at least one sequence of phonemes detected in the file's audio component and one or more of the phoneme sequences in the collection; and
  determining similarity of two or more of the plurality of files to each other based on the generated scores.

2. The method of claim 1, wherein the plurality of files comprise video data.

3. The method of claim 1, further comprising determining, based on the generated scores, that one or more of the files in the plurality of files is a copy of a given file.

4. The method of claim 1, further comprising associating the two or more of the plurality of files, based on establishing that the determined similarity exceeds a quantitative threshold.

5. The method of claim 4, further comprising accessing the two or more associated files together in response to a request to access one of the two or more associated files.

6. The method of claim 4, further comprising retrieving the two or more associated files together in response to a request to retrieve one of the two or more associated files.

7. The method of claim 4, further comprising storing the two or more associated files together.

8. The method of claim 4, wherein the two or more associated files are video files, and said associating is based on the audio components of the video files and not on the video data in the video files.

9. The method of claim 4, wherein said associating comprises tagging the two or more of the plurality of files.

10. The method of claim 1, wherein said generating a score depends on determining that the similarity between the at least one sequence of phonemes detected in the file's audio component and the one or more of the phoneme sequences in the collection exceeds a quantitative threshold.

11. The method of claim 1, wherein the limited number of phoneme sequences is associated with words of a spoken language.

12. The method of claim 1, wherein the generated score comprises one or more probabilities of one or more corresponding matches between the at least one sequence of phonemes detected in the file's audio component and the one or more of the phoneme sequences in the collection.

13. A system, comprising:
 a processor; and
 a memory coupled to the processor, wherein the memory stores program instructions executable by the processor to perform:
  accessing a previously identified collection containing a limited number of phoneme sequences;
  for each file of a plurality of files:
   detecting at least one sequence of phonemes in the file's audio component;
   comparing the at least one sequence of phonemes detected in the file's audio component to the collection of phoneme sequences; and
   generating a score, based on said comparing, that indicates a similarity between the at least one sequence of phonemes detected in the file's audio component and one or more of the phoneme sequences in the collection; and
  determining similarity of two or more of the plurality of files to each other based on the generated scores.

14. The system of claim 13, wherein the plurality of files comprise video data.

15. The system of claim 13, wherein the program instructions are further executable by the processor to perform determining, based on the generated scores, that one or more of the files in the plurality of files is a copy of a given file.

16. The system of claim 13, wherein the program instructions are further executable by the processor to perform associating the two or more of the plurality of files, based on establishing that the determined similarity exceeds a quantitative threshold.

17. The system of claim 16, wherein the program instructions are further executable by the processor to perform accessing the two or more associated files together in response to a request to access one of the two or more associated files.

18. The system of claim 16, wherein the program instructions are further executable by the processor to perform retrieving the two or more associated files together in response to a request to retrieve one of the two or more associated files.

19. The system of claim 13, wherein said generating a score depends on determining that the similarity between the at least one sequence of phonemes detected in the file's audio component and the one or more of the phoneme sequences in the collection exceeds a quantitative threshold.

20. A non-transitory computer readable storage medium storing computer program instructions that when executed by a computer cause the computer to perform:

accessing a previously identified collection containing a limited number of phoneme sequences;

for each file of a plurality of files:

detecting at least one sequence of phonemes in the file's audio component;

comparing the at least one sequence of phonemes detected in the file's audio component to the collection of phoneme sequences; and         generating a score, based on said comparing, that indicates a similarity between the at least one sequence of phonemes detected in the file's audio component and one or more of the phoneme sequences in the collection; and     determining similarity of two or more of the plurality of files to each other based on the generated scores.

21. The medium of claim 20, wherein the program instructions, when executed by the computer, cause the computer to further perform associating the two or more of the plurality of files, based on establishing that the determined similarity exceeds a quantitative threshold.

22. The medium of claim 21, wherein the program instructions, when executed by the computer, cause the computer to further perform storing the two or more associated files together.

23. The medium of claim 21, wherein the two or more associated files are video files, and said associating is based on the audio components of the video files and not on the video data in the video files.

24. The medium of claim 21, wherein said associating comprises tagging the two or more of the plurality of files.

25. The medium of claim 20, wherein the limited number of phoneme sequences is associated with words of a spoken language.

26. The medium of claim 20, wherein the generated score comprises one or more probabilities of one or more corresponding matches between the at least one sequence of phonemes detected in the file's audio component and the one or more of the phoneme sequences in the collection.

\* \* \* \* \*